United States Patent [19]

Knoth et al.

[11] 4,298,371
[45] Nov. 3, 1981

[54] PROCESS AND APPARATUS FOR MAKING HOLLOW GLASSWARE

[76] Inventors: Werner D. Knoth, Byfangerstr. 175, 4300 Essen 15; Helmut Münker, Rüstermark 27, 4300 Essen 1, both of Fed. Rep. of Germany

[21] Appl. No.: 96,744
[22] Filed: Nov. 23, 1979
[51] Int. Cl.³ .......................... C03B 9/00; C03B 9/18
[52] U.S. Cl. .......................................... 65/79; 65/229
[58] Field of Search ................. 65/81, 79, 78, 80, 229, 65/230, 264

[56] References Cited

U.S. PATENT DOCUMENTS

| | | | |
|---|---|---|---|
| 1,781,565 | 11/1930 | Beatty | 65/80 |
| 3,409,939 | 11/1968 | Hey | 65/81 |
| 3,490,891 | 1/1970 | Fouse | 65/79 X |
| 3,732,088 | 5/1973 | Zappia | 65/80 X |
| 4,004,906 | 1/1977 | Rowe | 65/79 |
| 4,212,841 | 7/1980 | Michel | 65/79 X |

OTHER PUBLICATIONS

Tooley, "The Handbook of Glass Manufacture", Books For Industry, 777 Third Ave., New York, N.Y., (c) 1974, vol. II, pp. 614–617.

Primary Examiner—Ronald Serwin
Attorney, Agent, or Firm—Karl F. Ross

[57] ABSTRACT

In the manufacture of hollow glass articles such as bottles, a gob of molten glass is blown or pressed into a parison in a premold, the parison being then transferred to a final mold where it is allowed to reside for a period sufficient to equalize its temperature before being blown into its ultimate shape. During the latter step, another final mold receives a parison meanwhile formed in the same premold. The two (or more) final molds associated with a given premold are mounted on a turntable for juxtaposition with the premold preparatorily to each transfer step.

3 Claims, 1 Drawing Figure

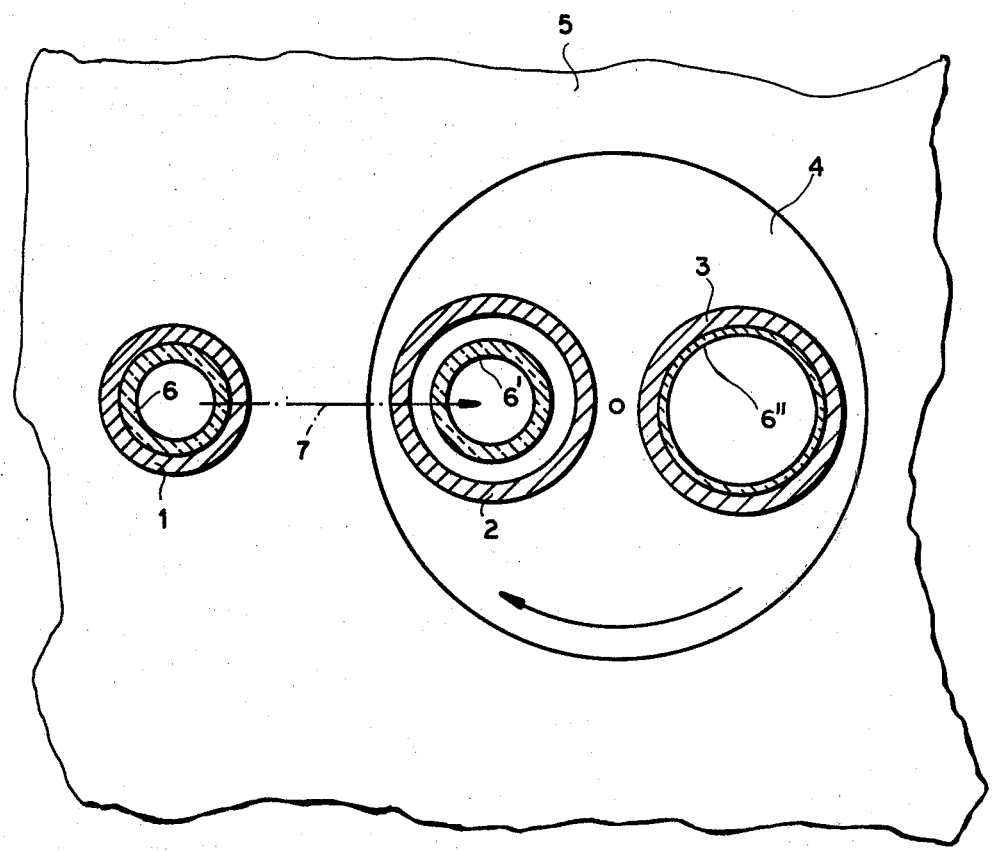

PROCESS AND APPARATUS FOR MAKING HOLLOW GLASSWARE

FIELD OF THE INVENTION

Our present invention relates to the manufacture of bottles and other hollow glassware by a two-stage blow-molding process.

BACKGROUND OF THE INVENTION

Hollow glass articles are conventionally mass-produced by introducing a gob of molten glass during each operating cycle of a glass-blowing apparatus into a premold in which a parison is formed by blowing or pressing. At the end of the cycle, the parison is transferred to a final mold where it is blown into the ultimate shape of the desired article during an immediately following cycle in which a new parison is formed in the premold, the sequence being then repeated.

The length of an operating cycle is determined inter alia by the time required for the cooling of the parison to the proper temperature for the final blowing. If the parison is too hot during conversion into the finished article, the latter will tend to deform upon its extraction from the blow mold; if it is too cold, it may not attain its desired final shape in that mold. Thus, it is customary to transfer the parison from the premold to the final mold only after it has cooled down sufficiently and its temperature has been substantially equalized throughout its cross-section, such equalization being a relatively slow process because of the poor thermal conductivity of the glass.

OBJECTS OF THE INVENTION

An important object of our present invention, therefore, is to provide an improved process for speeding up the manufacture of hollow glassware by the two-stage process described above.

A related object is to provide an apparatus for implementing this improved process.

SUMMARY OF THE INVENTION

In accordance with our improved process, a hot parison just formed in a premold is transferred in its heated state to a final mold in which it is allowed to reside for an extended cooling period while undergoing substantial equalization of its temperature by a flow of heat from the hotter core of its cross-section to its colder inner and outer surfaces. It is only after this cooling period that the parison is subjected in the same final mold to the blowing operation converting it into the desired article.

During this extended cooling period, at least one new parison can be formed in the premold previously used and can then be transferred to another final mold for the ultimate blowing step, whereupon a further parison is produced in the premold for transfer to the first final mold after the article blown from the original parison has been extracted therefrom.

An apparatus for implementing the process of our invention, therefore, comprises a plurality of blow molds associated with a single premold and positioning means for successively juxtaposing these blow molds with the associated premold in respective operating cycles, the apparatus further including transfer means for extracting a newly formed hot parison in each operating cycle from the premold and inserting it into the juxtaposed blow mold for cooling and temperature equalization, as described above, prior to its conversion into the finished article in a subsequent operating cycle. A turntable is advantageously used as the positioning means.

As will be apparent, three or more final blow molds could be associated with a premold to extend the cooling period and/or to increase the number of parisons formed in the premold during the cooling period.

BRIEF DESCRIPTION OF THE DRAWING

Our invention will now be described in detail with reference to the accompanying drawing the sole FIGURE of which schematically illustrates an apparatus for carrying out our improved glass-blowing process.

SPECIFIC DESCRIPTION

In the drawing we have shown a premold 1 and two final blow molds 2 and 3, the latter being mounted in diametrically opposite positions on a turntable 4. The bed of the otherwise conventional and not further illustrated glass-blowing apparatus has been indicated at 5.

The drawing also shows a parison 6 just formed in the premold 1 while a previously formed parison 6' resides in final mold 2 for an extended cooling period as discussed above. At the same time, mold 3 contains a finished article 6'' (e.g. a bottle) which has just been blown therein to its final shape from a parison formed in a still earlier cycle.

After the article 6'' has been extracted from mold 3, turntable 4 is rotated through 180° to juxtapose the empty mold 3 with the premold 1 whereupon the parison 6 can be removed from the premold to the mold 3 by transfer equipment schematically indicated at 7. Such transfer equipment, well known per se, may comprise a gripper arm carrying a neck ring in which the upper end of the parison—which later becomes the neck of the finished bottle—is releasably clamped. In the same manner, mold 2 becomes available for a new parison for premold 1 after the cooled parison 6' has been shaped into a finished article and extracted.

While the parison 6 is still quite hot at the time of its transfer from the premold to the adjacent final mold, its relatively large wall thickness limits any possible deformation at this stage; in any event, such deformation would have no effect upon the final shape to be subsequently imparted to it in the blow mold 2 or 3 in which it is initially received with clearance, as indicated for the parison 6', so as to expedite cooling and temperature equalization.

We claim:

1. A process for mass-producing hollow glass articles, comprising the steps of:
   (a) forming a hot first parison from a gob of molten glass in a premold;
   (b) transferring said first parison in its heated state to a first final mold;
   (c) forming a hot second parison from a gob of molten glass in said premold while letting said first parison cool in said first final mold;
   (d) transferring said second parison in its heated state to a second final mold;
   (e) forming a hot third parison from a gob of molten glass in said premold while letting said second parison cool in said second final mold and blowing said first parison in said first final mold into a shaped article; and (f) after removal of said shaped article from said first final mold, repeating the preceding steps.

2. An apparatus for mass-producing hollow glass articles, comprising:
   a premold;
   a support carrying a plurality of blow molds individually juxtaposable with said premold by an intermittent movement of said support in a succession of operating cycles; and
   transfer means for extracting a freshly formed hot parison in each operating cycle from said premold and inserting the extracted parison into a recently emptied blow mold juxtaposed therewith for cooling a temperature equalization concurrently with a shaping of a cooled parison into a finished article in a previously juxtaposed blow mold on said support.

3. An apparatus as defined in claim 2 wherein said support comprises a turntable.

* * * * *